(12) United States Patent
Kim et al.

(10) Patent No.: US 8,481,149 B2
(45) Date of Patent: Jul. 9, 2013

(54) POLYURETHANE RESIN COMPOSITION FOR MOUNTING PAD AND POLYURETHANE MOUNTING PAD USING THE SAME

(75) Inventors: Na-Ri Kim, Seoul (KR); Dong-Mok Shin, Daejeon (KR); Byeong-In Ahn, Daejeon (KR); Sang-Soon Choi, Daejeon (KR); Keong-Yeon Yoon, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/233,747

(22) Filed: Sep. 15, 2011

(65) Prior Publication Data

US 2012/0064326 A1 Mar. 15, 2012

(30) Foreign Application Priority Data

Sep. 15, 2010 (KR) ........................ 10-2010-0090477

(51) Int. Cl.
*B32B 27/40* (2006.01)
*C08L 75/04* (2006.01)

(52) U.S. Cl.
USPC ......................................... 428/220; 524/161

(58) Field of Classification Search
USPC ................... 524/158, 161; 428/220
See application file for complete search history.

(56) References Cited

U.S. PATENT DOCUMENTS

| | | | | |
|---|---|---|---|---|
| 3,526,531 | A | * | 9/1970 | Kitazawa et al. ............. 427/246 |
| 3,657,034 | A | * | 4/1972 | Fukushima et al. ............ 156/77 |
| 6,271,276 | B1 | | 8/2001 | Gribble et al. |
| 6,800,019 | B2 | | 10/2004 | Tanaka et al. |
| 7,306,825 | B2 | | 12/2007 | Mobley et al. |
| 2010/0087128 | A1 | | 4/2010 | Nakayama et al. |
| 2010/0222492 | A1 | | 9/2010 | Sarkisian et al. |

FOREIGN PATENT DOCUMENTS

| | | |
|---|---|---|
| CN | 1760225 | 4/2006 |
| CN | 101635332 | 1/2010 |
| CN | 101748811 A | 6/2010 |
| JP | 54-126267 | * 10/1979 |
| JP | 2002-066911 A | 3/2002 |
| JP | 2002-212257 | 7/2002 |
| JP | 2005-120253 A | 5/2005 |
| JP | 2005-212057 A | 8/2005 |
| JP | 2007-000973 A | 1/2007 |
| WO | 01/55237 A1 | 8/2001 |

* cited by examiner

*Primary Examiner* — John Uselding
(74) *Attorney, Agent, or Firm* — Rothwell, Figg, Ernst & Manbeck, P.C.

(57) ABSTRACT

This disclosure relates to a polyurethane resin composition for a mounting pad, including a polyurethane resin, C9-15 alkyl benzene sulfonic acid or a salt thereof, and a DMF solvent, and a polyurethane mounting pad using the same, whereby long and large pores may be uniformly formed thereinside to provide a mounting pad having low hardness, excellent compressibility, and a high compression modulus.

8 Claims, 4 Drawing Sheets

POLYURETHANE RESIN COMPOSITION FOR MOUNTING PAD AND POLYURETHANE MOUNTING PAD USING THE SAME

CROSS REFERENCE TO RELATED APPLICATIONS

This application claims priority under 35 U.S.C. §119 to Korean Patent Application No. 10-2010-0090477 filed Sep. 15, 2010, which is incorporated herein in its entirety.

TECHNICAL FIELD

The present invention relates to a polyurethane resin composition for a mounting pad and a polyurethane mounting pad using the same, and more particularly to a polyurethane resin composition in which long and large pores are uniformly formed, and is thus capable of providing a mounting pad having high compressibility and compression recovery rate while having low density, and a polyurethane mounting pad using the same.

BACKGROUND OF ART

Since a fine and precise surface is required for a substrate that is used for a semiconductor device or a display device requiring a high degree of integration, various planarization methods are applied. Particularly, due to the trend of high integration and high performance of the semiconductor device or display device, a method of polishing while relatively moving a polishing pad and a subject to be polished, while supplying a slurry composition including polishing particles and various chemical ingredients between the polishing pad and the subject to be polished, is generally used. In this polishing method, for more precise polishing, the subject to be polished is fixed on a mounting pad so as to maintain a constant location and position during the polishing or processing process.

However, a previously known mounting pad has internal pores of different sizes and the distribution of the pores is irregular, and thus the cushion property and adsorption to a subject to be polished is not good. Further, a subject to be polished cannot securely contact a mounting pad during a polishing process, and thus precise polishing may not be achieved. In addition, since a previous mounting pad exhibits non-uniform size and distribution of internal pores, the properties such as compressibility and compression recovery rate are not good and water repellency is not sufficient, and thus a subject to be polished does not have uniform contact during a polishing or processing process.

SUMMARY OF THE INVENTION

It is an object of the present invention to provide a polyurethane resin composition in which long and large pores are uniformly formed, thus being capable of providing a mounting pad having high compressibility and compression recovery rate while having low density.

It is another object of the present invention to provide a polyurethane mounting pad in which long and large pores are uniformly formed, thus exhibiting high compressibility and compression recovery rate while having low density.

The present invention provides a polyurethane resin composition for a mounting pad including polyurethane resin, C9-15 alkyl benzene sulfonic acid or a salt thereof, and a DMF solvent.

The present invention also provides a polyurethane mounting pad including a coagulated material of the polyurethane resin composition for a mounting pad.

DESCRIPTION OF THE EMBODIMENT

Figure 1:
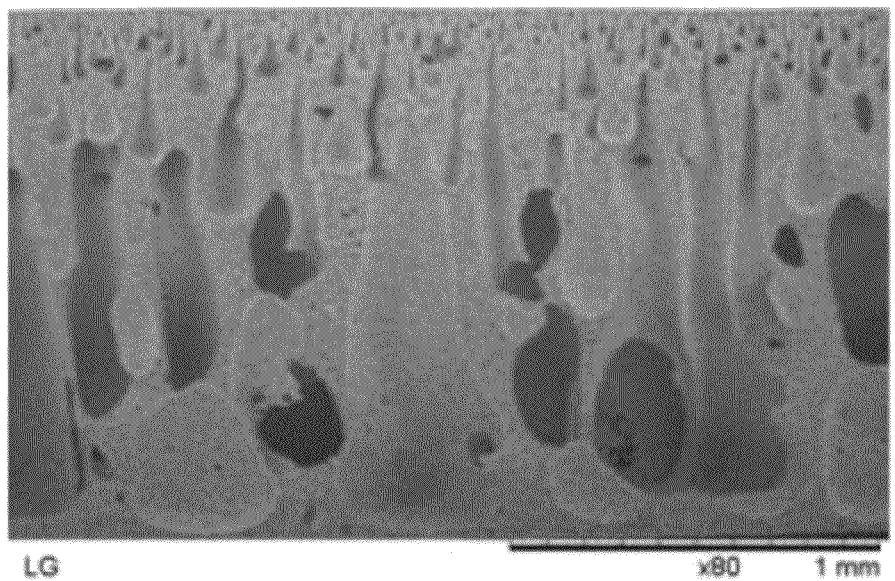
FIG. 1 shows a cross-sectional SEM photograph of the polyurethane pad manufactured in Example 1.

Hereinafter, a polyurethane resin composition for a mounting pad and a polyurethane mounting pad using the same according to specific embodiments will be explained in detail.

As used herein, the term "mounting pad" refers to a pad that is attached to a carrier and contacts a film to be polished in a polishing process during a manufacturing process of a substrate used in a semiconductor or display device.

According to one embodiment of the invention, a polyurethane resin composition for a mounting pad including polyurethane resin, C9-15 alkyl benzene sulfonic acid or a salt thereof, and a DMF solvent is provided.

In general, if a composition including polyurethane resin and an organic solvent is coagulated in a coagulation bath containing an organic solvent and water, phase separation of the ingredients of the resin composition, for example phase separation of the polyurethane resin, water, and the organic solvent occurs, whereby a polyurethane resin including a plurality of pores formed therein may be obtained. However, if a previously known polyurethane resin composition is used, it is not easy to control the size, shape, and distribution of the pores formed in resin, and it is not easy to secure appropriate properties for use as a mounting pad.

As the result of studies of the inventors, it was confirmed that if a polyurethane resin composition obtained by mixing C9-15 alkyl benzene sulfonic acid or a salt thereof with polyurethane resin and a DMF solvent, a mounting pad exhibiting high compressibility and compression recovery rate while having low density may be provided. Further, since a mounting pad manufactured using the polyurethane resin composition includes long and large pores uniformly formed therein, air generated between the mounting pad and a film to be polished may be easily delivered inside and uniformly dispersed over the whole area, and thus faults that may be generated during polishing may be minimized.

The C9-15 alkyl benzene sulfonic acid or a salt thereof increases the penetration speed of water when the polyurethane resin composition is coagulated, thus allowing longer and larger pores. Specifically, the C9-15 alkyl benzene sulfonic acid or a salt thereof may easily penetrate water or an aqueous solution over the whole area of the composition, compared to previously known anionic surfactants, for example succinic acid or a derivative thereof, and thereby allows formation of longer and larger pores in the mounting pad.

The C9-15 alkyl bezene sulfonic acid may include an ortho-, meta-, or para-substituent, and preferably, it may be para-dodecylbenzene sulfonic acid. Further, the C9-15 alkyl benzene sulfonic acid salt may be a metal salt of alkyl benzene sulfonic acid, for example, sodium C9-15 alkyl benzene sulfonate, potassium C9-15 alkyl benzene suflonate, or ammonium C9-15 alkyl benzene sulfonate, and preferably sodium para-dodecylbenzenesulfonate, potassium para-dodecylbenzenesulfonate, or ammonium para-dodecylbenzenesulfonate.

The C9-15 alkyl benzene sulfonic acid may be a compound of the following Chemical Formula 1.

[Chemical Formula 1]

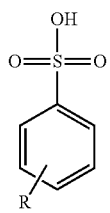

In Chemical Formula 1, R is a C9-15 alkyl group, and preferably a dodecyl group.

The polyurethane resin may have a weight average molecular weight of 30,000 to 1,000,000, and preferably 50,000 to 500,000, and it may have viscosity of 30,000 to 1,000,000 cps, and preferably 50,000 to 500,000 cps, at room temperature in a 30% DMF solution state.

During the preparation process of the polyurethane mounting pad, pores may be formed as dimethylformamide in the polyurethane resin is dissolved in water and moves out, wherein if a polyurethane resin having a molecular weight or viscosity within the above range is used, a plurality of pores may be formed with uniform size and distribution. If the viscosity of the polyurethane resin is less than 30,000 cps, appropriate properties for a mounting pad may not be obtained and manufacture of a mounting pad may be difficult, and if the viscosity is 1,000,000 cps or more, it may be difficult to form pores in the mounting pad and the hardness of the mounting pad may be significantly increased.

Meanwhile, the polyurethane resin composition for a mounting pad may include 3 to 50 wt %, and preferably 5 to 30 wt %, of the polyurethane resin. If the polyurethane resin content in the resin composition is too low, it may be difficult to appropriately form a mounting pad body and the viscosity of the composition may become too low, and thus it may not be easy to apply the composition for a coating process for manufacturing a mounting pad. If the polyurethane resin content in the resin composition is too high, density of the obtained polyurethane mounting pad may become higher than needed or the viscosity may become too high, and thus it may not be easy to apply the composition for a coating process for manufacturing a mounting pad.

The polyurethane resin composition may include a dimethylformamide (DMF) solvent, which refers to a solvent including N,N'-dimethylformamide. If the polyurethane resin composition is coagulated, phase separation of the ingredients of the resin composition, for example phase separation of polyurethane resin, water, and a DMF solvent occur, thus forming a polyurethane mounting pad including pores formed therein. Specifically, the DMF solvent existing in the polyurethane resin is replaced with water in a coagulation bath during a coagulation process of the resin composition, and if the coagulation process is completed, polyurethane resin for a mounting pad including pores formed therein is formed.

The polyurethane resin composition may include 40 to 90 wt %, and preferably 50 to 80 wt %, of the DMF solvent. If the content of the DMF solvent in the resin composition is too low, formation of pores in the resin may not smoothly occur during a coagulation process, and if the content is too high, the ratio of the polyurethane resin may be largely decreased, and thus it may be difficult to manufacture a polyurethane mounting pad having appropriate properties.

The polyurethane resin composition for a mounting pad may include 0.1 to 5 wt %, and preferably 0.1 to 2 wt %, of the C9-15 alkyl benzene sulfonic acid or a salt thereof. If the content of the C9-15 alkyl benzene sulfonic acid or a salt thereof is less than 0.1 wt %, the size of the pores may be too small or the shape of the pores may not be long, and if the content exceeds 5 wt %, surface roughness of the pad may become bad, and thus uniform adsorption surface may not be provided.

Meanwhile, the polyurethane resin composition for a mounting pad may further include an anionic surfactant or a nonionic surfactant.

The anionic surfactant, when used together with the C9-15 alkyl benzene sulfonic acid or a salt thereof, may increase the penetration speed of water to allow formation of longer and larger pores in the adsorption pad. Specific examples of the anionic surfactant may include succinic acid and a derivative thereof, but are not limited thereto.

The nonionic surfactant, when used together with the C9-15 alkyl benzene sulfonic acid or a salt thereof, may increase adsorption of the mounting pad or planarize the surface of the pad. Specific examples of the nonionic surfactant may include a silicon polymer, silicon oil, a glycerol polymer, a hydrocarbon polymer, and the like.

The content of the anionic surfactant or nonionic surfactant may be appropriately controlled considering the properties of the manufactured mounting pad or process conditions and the like, and for example, each may be included at 0.1 to 10 wt % in the polyurethane resin composition for a mounting pad.

Further, the polyurethane resin composition for a mounting pad may further include at least one additive selected from the group consisting of a colorant, a water repellent, a filler, a pore size controller, and a pigment. The content of the additives may be appropriately controlled considering the properties of the manufactured mounting pad or process conditions and the like, and for example, a total of 0.1 to 15 wt % of the additives may be included in the polyurethane resin composition for a mounting pad.

According to another embodiment of the invention, a polyurethane mounting pad including a coagulated material of the polyurethane resin composition for a mounting pad is provided.

In the polyurethane mounting pad manufactured from the polyurethane resin composition, long and large pores are uniformly formed, and thus low density and simultaneously high compressibility and compression recovery rate may be exhibited. Further, since long and large pores are uniformly formed in the polyurethane mounting pad, air generated between the polyurethane mounting pad and a film to be polished may be easily delivered inside and uniformly dispersed over the whole area, and thus faults that may be generated during polishing may be minimized.

The polyurethane mounting pad may be formed by coagulation of the polyurethane resin composition. Specifically, the polyurethane mounting pad may have morphology wherein pores having maximum diameter of 100 um to 500 um, preferably 150 um to 400 um, are uniformly formed in the polyurethane resin. The maximum diameter of the pores may be measured by a cross-sectional SEM photograph of the mounting pad, and the like.

Further, the polyurethane mounting pad may be manufactured by forming the polyurethane resin composition, coating or introducing the polyurethane resin composition on a substrate or mold to form a coating layer, coagulating the coating layer, and washing, dehydrating, and drying the coagulated material of the composition.

The coagulating of the coating layer may be conducted by introducing the substrate or mold on which the coating layer is formed into a coagulation bath filled with an aqueous solution of dimethylformamide. In the coagulation process, dimethylformamide in the polyurethane resin is replaced with water and the polyurethane resin is slowly coagulated, and thereby a plurality of pores may be formed. After the coagulation process, water and a DMF solvent may remain in the adsorption pad, and the coagulated material may be washed and dried in an oven to remove the water, the DMF solvent, the alkyl benzene sulfonic acid, and other ingredients in the adsorption pad.

The polyurethane mounting pad may have a thickness of 0.1 to 5.0 mm and a density of 0.01 to 1.0 g/cm$^3$, preferably 0.10 to 0.35 g/cm$^3$.

Figure 4:
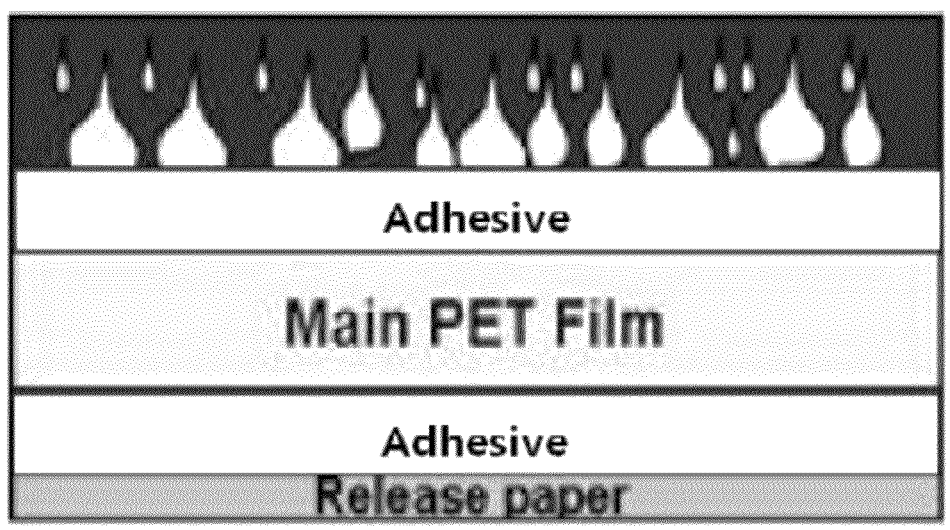
FIG. 4 schematically shows one example of the finally product-realized polyurethane mounting pad.

Meanwhile, as shown in FIG. 4, the polyurethane mounting pad may be finally realized by being fixed to a substrate such as a PET film and the like by an adhesive. More specifically, the polyurethane mounting pad may be bonded on one side of the substrate film such as a PET film and the like by an adhesive, and a release paper may be bonded on the other side of the PET film by an adhesive. When the final product of the polyurethane mounting pad is applied to a polishing device, the release paper may be removed and the polyurethane mounting pad may be bonded to the polishing device and used.

According to the present invention, a polyurethane resin composition in which long and large pores are uniformly formed, thus being capable of providing a mounting pad exhibiting high compressibility and compression recovery rate while having low density, and a polyurethane mounting pad obtained using the resin composition may be provided.

EXAMPLES

Hereinafter, the present invention will be explained with reference to the following examples. However, these examples are only to illustrate the invention, and the scope of the invention is not limited thereto.

Example and Comparative Example: Preparation of a Polyurethane Resin Composition for a Mounting Pad and a Polyurethane Pad

Example 1

100 g of polyurethane resin (30 wt % DMF solution) having a 100% modulus of 5.0 MPa, 45 g of N,N'-dimethylformamide, 2.0 g of para-dodecylbenzene sulfonic acid, 5.0 g of a nonionic surfactant (SD-7, Pentachem), 15 g of a colorant (KW BLACK 0013, carbon black resin, Pentachem), 2.0 g of a filler (FAT-17, Pentachem), and 0.5 g of a water repellent (fluorine-based resin, FPU-60, Pentachem) were introduced into a container and agitated at high speed for 10 minutes with a paint shaker, and then centrifuged at 3000 rpm for 10 minutes to obtain a polyurethane resin composition of a slurry phase.

The obtained polyurethane resin composition was coated on a PET film to a thickness of 2.00 mm, and then coagulated in a coagulation bath of a 4 Brix % concentration. Then, the obtained coagulated material was washed, dehydrated, and dried to manufacture a polyurethane mounting pad. A cross-sectional SEM photograph of the manufactured polyurethane mounting pad is shown in FIG. 1.

Example 2

100 g of polyurethane resin (30 wt % DMF solution) having a 100% modulus of 3.5 MPa, 65 g of N,N'-dimethylformamide, 0.5 g of para-dodecylbenzene sulfonic acid, 4 g of a succinic acid derivative (SD-11, Pentachem), 2.0 g of a nonionic surfactant (SD-7, Pentachem), 7 g of a colorant (KW BLACK 0013, carbon black resin, Pentachem), 1.5 g of a filler (FAT-17, Pentachem), and 2 g of a water repellent (fluorine-based resin, FPU-60, Pentachem) were introduced into a container and agitated at high speed for 10 minutes with a paint shaker, and then centrifuged at 3000 rpm for 10 minutes to obtain a polyurethane resin composition of a slurry phase.

Figure 2:
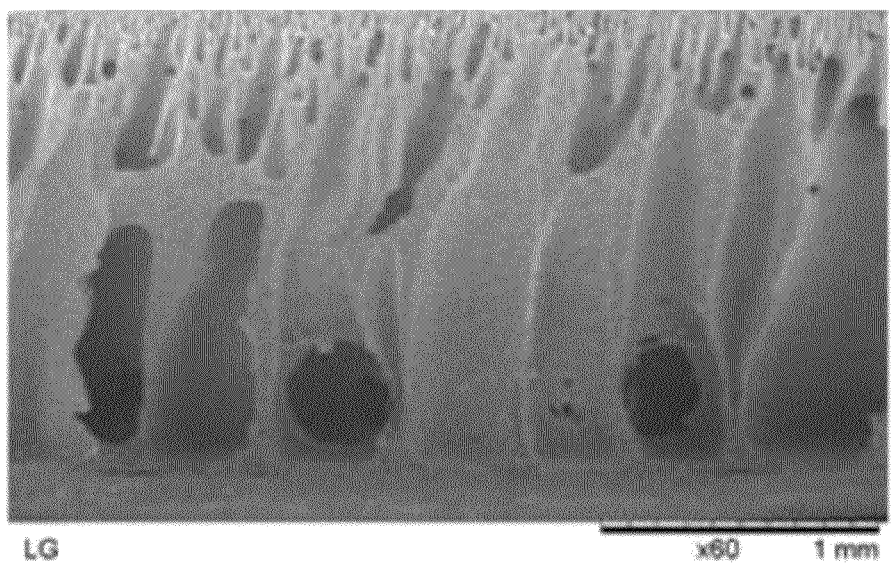
FIG. 2 shows a cross-sectional SEM photograph of the polyurethane pad manufactured in Example 2.

The obtained polyurethane resin composition was coated on a PET film to a thickness of 2.00 mm, and then coagulated in a coagulation bath of a 4 Brix % concentration. Then, the obtained coagulated material was washed, dehydrated, and dried to manufacture a polyurethane mounting pad. A cross-sectional SEM photograph of the manufactured polyurethane mounting pad is shown in FIG. 2.

Comparative Example 1

Figure 3:
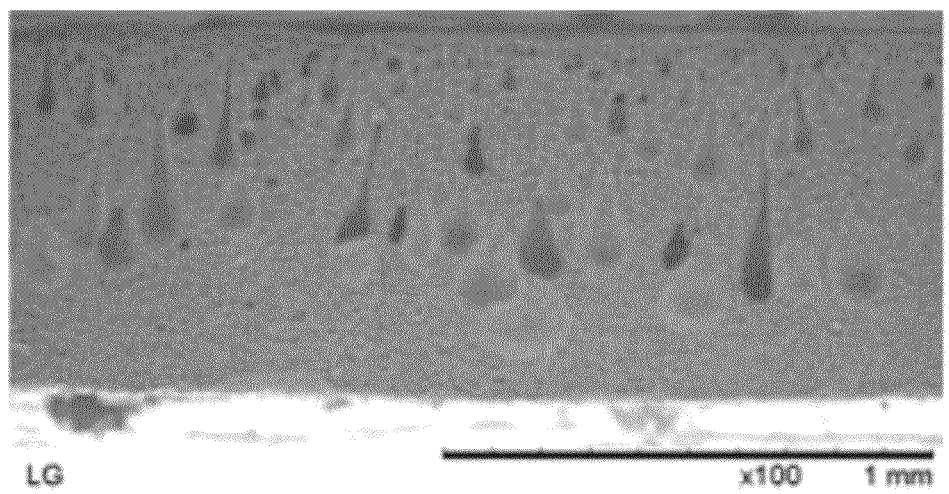
FIG. 3 shows a cross-sectional SEM photograph of the polyurethane pad manufactured in Comparative Example 1.

A polyurethane resin composition and an adsorption pad were prepared by the same method as Example 2, except that para-dodecylbenzene sulfonic acid was not used (FIG. 3).

The compositions of the polyurethane resin compositions for a mounting pad manufactured in Examples 1 and 2 and Comparative Example 1 are described in the following Table 1.

TABLE 1

| | | | | | | | | |
|---|---|---|---|---|---|---|---|---|
| | | | | (unit: g) | | | | |
| | Polyurethane resin (solid content 30%, DMF 70%) | DMF | Pigment | Para-dodecylbenzene sulfonic acid | Nonionic surfactant | Succinic acid derivative | Water repellent | Filler |
| Example 1 | 100 | 45 | 15 | 2 | 5 | 0 | 0.5 | 2 |
| Example 2 | 100 | 65 | 7 | 0.5 | 2 | 4 | 2 | 1.5 |
| Comparative Example 1 | 100 | 65 | 7 | — | 2 | 4 | 2 | 1.5 |

Experimental Example

The density, compressibility, and compression modulus of the mounting pads obtained in Examples 1 and 2 and Comparative Example 1 were measured as follows.

Experimental Example 1

Measurement of Density of Mounting Pad

Each sample of the polyurethane mounting pads obtained in the examples and comparative example was prepared with a size of 25 mm×30 mm, the thickness was measured, and then the weight of the sample was measured to calculate the density. The weight of the sample was measured 5 times, each density was calculated, and the density of the mounting pad was obtained from the average value.

Experimental Example 2

Measurement of Compressibility and Compression Recovery Rate of Mounting Pad The compressibility and compression recovery rate of the polyurethane mounting pads obtained in the examples and comparative example were measured according to JIS L1021-16.

Specifically, the polyurethane mounting pads obtained in the examples and comparative example were cut to prepare each sample with a size of 25 mm×30 mm. an initial load of 100 g/cm$^2$ placed on the sample for 30 seconds, and then the initial thickness was measured using a dial gauge (T0). A load of 1120 g/cm$^2$ was then placed on the sample, and then the thickness was measured under pressure (T1). Next, both loads were removed, and the sample was allowed to stand for 5 minutes, and then the initial load of 100 g/cm$^2$ was added again for 30 minutes, and the thickness was measured (T0'). Each measured thickness was applied to the following formula to calculate compressibility and compression recovery rate.

$$\text{Compressibility (\%)} = (T0-T1)*100/T0$$

$$\text{Compression recovery rate (\%)} = (T0'-T1)*100/(T0-T1) \quad \text{[Formula]}$$

The results of Experimental Examples 1 and 2 are shown in the following Table 2.

TABLE 2

| | Density (g/cm$^3$) | Compressibility (%) | Compression modulus (%) |
|---|---|---|---|
| Example 1 | 0.25 | 38.9 | 94.9 |
| Example 2 | 0.21 | 63.8 | 96.1 |
| Comparative Example 1 | 0.35 | 21.0 | 92.9 |

As shown in Table 2, it is confirmed that the mounting pads of Examples 1 and 2 using dodecylbenzene sulfonic acid exhibit excellent compressibility of 30% or more and a high compression modulus of 95% or more while having a low density, compared to the mounting pad not using dodecylbenzene sulfonic acid.

As shown in FIGS. 1 to 3, it is confirmed that in the mounting pads according to Examples 1 and 2, long and large pores are uniformly formed, and the maximum diameter of the pores is in the range of 150 um to 400 um. To the contrary, the adsorption pad of Comparative Example 1 has relatively short and small pores, and the distribution is non-uniform.

Accordingly, the mounting pad of the examples may improve the cushion property and adsorption to a subject to be polished, and strongly contact the subject to be polished on the pad during a polishing process, thus preventing deterioration of polishing quality.

The invention claimed is:

1. A polyurethane resin composition for a mounting pad comprising:
    polyurethane resin;
    at least one compound selected from the group consisting of para-dodecylbenzene sulfonic acid, sodium para-dodecylbenzenesulfonate, potassium para-dodecylbenzenesulfonate, and ammonium para-dodecylbenzenesulfonate;
    an anionic surfactant comprising succinic acid and a derivative thereof; and
    a DMF solvent,
    wherein the mounting pad has a compressibility of 30% or more and a compression modulus of 95% or more, as measured according to JIS L1021-16, and a density of 0.10 to 0.35 g/cm$^3$.

2. The polyurethane resin according to claim 1, wherein the polyurethane resin has a weight average molecular weight of 30,000 to 1,000,000, or has a viscosity of 30,000 to 1,000,000 cps at room temperature in a 30% DMF solution state.

3. The polyurethane resin according to claim 1, comprising:
    3 to 50 wt % of the polyurethane resin;
    40 to 90 wt % of the DMF solvent;
    0.1 to 10 wt % of an anionic surfactant comprising succinic acid and a derivative thereof; and
    0.1 to 5 wt % of the at least one compound selected from the group consisting of para-dodecylbenzene sulfonic acid, sodium para-dodecylbenzenesulfonate, potassium para-dodecylbenzenesulfonate, and ammonium para-dodecylbenzenesulfonate.

4. The polyurethane resin according to claim 1, further comprising a nonionic surfactant.

5. The polyurethane resin according to claim 1, further comprising at least one selected from the group consisting of a filler, a water repellent, a pore size controller, and a pigment.

6. The polyurethane resin according to claim 3, further comprising:
    0.1 to 10 wt % of a nonionic surfactant; and
    0.1 to 15 wt % of at least one additive selected from the group consisting of a filler, a water repellent, a pore size controller, and a pigment.

7. A polyurethane mounting pad comprising a coagulated material of the polyurethane resin composition for a mounting pad according to claim 1; and
    wherein the polyurethane mounting pad has a compressibility of 30% or more and a compression modulus of 95% or more, as measured according to JIS L1021-16, and a density of 0.10 to 0.35 g/cm$^3$,
    wherein pores having a maximum diameter of 150 μm to 400 μm are formed in the polyurethane resin.

8. The polyurethane mounting pad according to claim 7, wherein the polyurethane mounting pad has a thickness of 0.1 to 5.0 mm.

* * * * *